United States Patent
Ren et al.

(10) Patent No.: US 10,599,302 B2
(45) Date of Patent: Mar. 24, 2020

(54) METHOD FOR PERFORMING CONTENT FLIPPING OPERATION ON TOUCHSCREEN AND TERMINAL

(71) Applicant: HUAWEI DEVICE CO., LTD., Shenzhen (CN)

(72) Inventors: Yi Ren, Shenzhen (CN); Fengbing Shi, Shenzhen (CN)

(73) Assignee: HUAWEI DEVICE CO.,LTD., Dongguan (CN)

( * ) Notice: Subject to any disclaimer, the term of this patent is extended or adjusted under 35 U.S.C. 154(b) by 56 days.

(21) Appl. No.: 15/707,685

(22) Filed: Sep. 18, 2017

(65) Prior Publication Data

US 2018/0004378 A1 Jan. 4, 2018

Related U.S. Application Data

(63) Continuation of application No. 14/262,207, filed on Apr. 25, 2014, now abandoned, which is a (Continued)

(51) Int. Cl.
*G06F 3/0484* (2013.01)
*G06F 3/0488* (2013.01)
*G06F 3/0482* (2013.01)

(52) U.S. Cl.
CPC .......... *G06F 3/0484* (2013.01); *G06F 3/0482* (2013.01); *G06F 3/0488* (2013.01); *G06F 3/04842* (2013.01); *G06F 3/04883* (2013.01)

(58) Field of Classification Search
CPC .. G06F 3/04883; G06F 3/0482; G06F 3/0488; G06F 3/04842; G06F 3/0484
See application file for complete search history.

(56) References Cited

U.S. PATENT DOCUMENTS 6,639,612 B2 10/2003 Bosma et al.
6,862,712 B1 3/2005 Nakagawa et al.
(Continued)

FOREIGN PATENT DOCUMENTS

CN 101127983 A 2/2008
CN 101256468 A 9/2008
(Continued)

OTHER PUBLICATIONS

First Office Action (including English translation) issued in corresponding Chinese Patent Application No. 201280000171.3, dated Jun. 26, 2013, 12 pages.
(Continued)

*Primary Examiner* — Arpan P. Savla
*Assistant Examiner* — Haimei Jiang
(74) *Attorney, Agent, or Firm* — Conley Rose, P.C.

(57) ABSTRACT

The present invention discloses a method for performing an operation on a touchscreen and a terminal, and relates to the terminal field, which can implement a batch operation on multiple entries of displayed entries and improve an operation speed of a user. Embodiments of the present invention disclose a method for performing an operation on a touchscreen, including: receiving a touch operation when content currently displayed on the touchscreen is a displayed entry, where the displayed entry corresponds to a data entry stored in a terminal; and performing, when a track of the touch operation of the user is a sliding track on a preset area, a preset operation on each entry that the track of the touch operation passes through, where the preset area is a part of a current operation interface.

19 Claims, 7 Drawing Sheets

Related U.S. Application Data continuation of application No. PCT/CN2012/072006, filed on Mar. 6, 2012.

(56) References Cited

U.S. PATENT DOCUMENTS

| | | | |
|---|---|---|---|
| 6,901,556 | B2 | 5/2005 | Bosma et al. |
| 2004/0135817 | A1 | 7/2004 | Daughtery et al. |
| 2006/0132455 | A1 | 6/2006 | Rimas-Ribikauskas et al. |
| 2007/0229471 | A1* | 10/2007 | Kim .................. G06F 3/0488 345/173 |
| 2008/0042984 | A1 | 2/2008 | Lim et al. |
| 2008/0222559 | A1 | 9/2008 | Kim |
| 2008/0250354 | A1 | 10/2008 | Park |
| 2008/0282190 | A1* | 11/2008 | Kagaya .................. G06F 16/48 715/794 |
| 2008/0309643 | A1 | 12/2008 | Arimoto |
| 2008/0309644 | A1* | 12/2008 | Arimoto .............. H04N 1/0035 345/173 |
| 2009/0100382 | A1 | 4/2009 | Skuratovsky |
| 2009/0178008 | A1 | 7/2009 | Herz et al. |
| 2009/0282332 | A1* | 11/2009 | Porat .................. G06F 3/0482 715/702 |
| 2010/0245274 | A1 | 9/2010 | Fukuda |
| 2010/0265185 | A1 | 10/2010 | Oksanen |
| 2010/0289743 | A1* | 11/2010 | Sun .................. G06F 3/017 345/158 |
| 2011/0063327 | A1 | 3/2011 | Shimizu |
| 2011/0154196 | A1* | 6/2011 | Icho .................. G06F 3/0485 715/702 |
| 2011/0185308 | A1* | 7/2011 | Machida ............... G06F 3/0485 715/784 |
| 2011/0205163 | A1* | 8/2011 | Hinckley .............. G06F 3/0483 345/173 |
| 2012/0030566 | A1* | 2/2012 | Victor .................. G06F 3/0482 715/702 |
| 2012/0096400 | A1* | 4/2012 | Cho .................. G06F 3/0482 715/810 |
| 2012/0216150 | A1 | 8/2012 | Wernecke |
| 2012/0320057 | A1* | 12/2012 | Gutierrez ............... G06T 17/05 345/427 |
| 2012/0327098 | A1 | 12/2012 | Cheng |
| 2013/0141378 | A1* | 6/2013 | Yumiki .................. G06F 3/041 345/173 |
| 2013/0227480 | A1* | 8/2013 | Kim .................. G06F 3/04817 715/810 |
| 2014/0119673 | A1* | 5/2014 | Rathnavelu ............. G06T 11/60 382/284 |
| 2014/0237399 | A1 | 8/2014 | Ren et al. |
| 2016/0117096 | A1 | 4/2016 | Miyashita et al. |

FOREIGN PATENT DOCUMENTS

| | | |
|---|---|---|
| CN | 101325637 A | 12/2008 |
| CN | 101617288 A | 12/2009 |
| CN | 101727282 A | 6/2010 |
| CN | 101847076 A | 9/2010 |
| CN | 101893982 A | 11/2010 |
| CN | 101943995 A | 1/2011 |
| CN | 102025902 A | 4/2011 |
| CN | 102033690 A | 4/2011 |
| CN | 102096543 A | 6/2011 |
| CN | 102117175 A | 7/2011 |
| CN | 102262507 A | 11/2011 |
| CN | 102662555 A | 9/2012 |
| CN | 103019577 A | 4/2013 |
| EP | 1416368 A2 | 5/2004 |
| JP | 2000259306 A | 9/2000 |
| JP | 2001184167 A | 7/2001 |
| JP | 2007025023 A | 2/2007 |
| JP | 2008310543 A | 12/2008 |
| JP | 2009003579 A | 1/2009 |
| JP | 2011154555 A | 8/2011 |
| KR | 20120050971 A | 5/2012 |
| WO | 2010134748 A2 | 11/2010 |

OTHER PUBLICATIONS

Second Office Action (including English translation) issued in corresponding Chinese Patent Application No. 201280000171.3, dated Mar. 14, 2014, 14 pages.
First Office Action (including English translation) issued in corresponding Chinese Patent Application No. 201210056739.5, dated Jul. 23, 2013, 13 pages.
Extended European Search Report issued in corresponding European Patent Application No. 127369692, dated Feb. 17, 2015, 9 pages.
Communication Pursuant to Article 94(3) EPC issued in corresponding European Patent Application No. 13757339.0, dated Jun. 6, 2017, 8 pages.
Notice of Reason(s) for Rejection (including English translation) issued in corresponding Japanese Patent Application No. 2014-560235, dated Dec. 15, 2015, 11 pages.
Notice of Preliminary Rejection (including English translation) issued in corresponding Korean Patent Application No. 10-2014-7027131, dated Nov. 13, 2015, 13 pages.
Notice of Allowance (including English translation) issued in corresponding Korean Patent Application No. 10-2014-7027131, dated Jun. 28, 2016, 3 pages.
International Search Report (including English translation) issued in corresponding International Application No. PCT/CN2012/072006, dated Dec. 13, 2012, 6 pages.
International Search Report and Written Opinion (including English translation) issued in corresponding International Application No. PCT/CN2013/072209, dated Jun. 13, 2013, 23 pages.

* cited by examiner

METHOD FOR PERFORMING CONTENT FLIPPING OPERATION ON TOUCHSCREEN AND TERMINAL

CROSS-REFERENCE TO RELATED APPLICATIONS

This application is continuation of U.S. patent application Ser. No. 14/262,207, filed on Apr. 25, 2014, which is a continuation of International Patent Application No. PCT/CN2012/072006, filed on Mar. 6, 2012. Both of the aforementioned applications are hereby incorporated by reference in their entireties.

TECHNICAL FIELD

The present invention relates to the terminal field, and in particular, to a method for performing an operation on a terminal touchscreen and a terminal.

BACKGROUND

At present, a touchscreen is widely used in terminal products such as mobile phones and tablet computers. When a user needs to perform an operation on multiple displayed entries on a display interface of a terminal device, two methods are normally available. One method is selecting multiple displayed entries on a touchscreen one by one until all required entries are selected. The other method is, when the device provides a select-all operation, directly selecting all entries. For example, when an SMS message needs to be sent to a group of contacts in a mobile phone, the contacts need to be selected one by one until the group of contacts required by the user is selected, or all contacts are directly selected.

During the implementation of the foregoing technical solutions, the inventor finds that the prior art has at least the following problem: Much time is consumed for the user to select the displayed entries one by one, which hinders improving an operation speed and operation experience of the user; moreover, when the user does not need to select all contacts, the operation manner of directly selecting all contacts is not useful.

SUMMARY

Embodiments of the present invention provide a method for performing an operation on a touchscreen and a terminal, which can implement free selection and a batch operation on several entries of displayed entries, thereby improving an operation speed of a user.

To achieve the foregoing objective, the embodiments of the present invention use the following technical solutions:

A method for performing an operation on a touchscreen, including:

receiving a touch operation when content currently displayed on the touchscreen is a displayed entry, where the displayed entry corresponds to a data entry stored in a terminal; and performing, when a track of the touch operation is a sliding track on a preset area, a preset operation on each entry that the track of the touch operation passes through, where the preset area is a part of a current operation interface.

A terminal, including:

a user operation receiving unit, configured to receive a touch operation when content currently displayed on a touchscreen is a displayed entry, where the displayed entry corresponds to a data entry stored in the terminal; and an action unit, configured to perform, when a track of the touch operation is a sliding track on a preset area, a preset operation on each entry that the track of the touch operation passes through, where the preset area is a part of a current operation interface.

According to the method for performing an operation on a touchscreen and the terminal provided by the embodiments of the present invention, it is detected whether a user performs a sliding operation on a preset area of a touchscreen, and when it is detected that the user performs the touch operation on the preset area, a preset operation is performed on each displayed entry that a track of the touch operation passes through, thereby avoiding an entry-by-entry operation performed by the user on displayed entries, implementing free selection and a batch operation on several entries of the displayed entries, and reducing operation time of the user.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
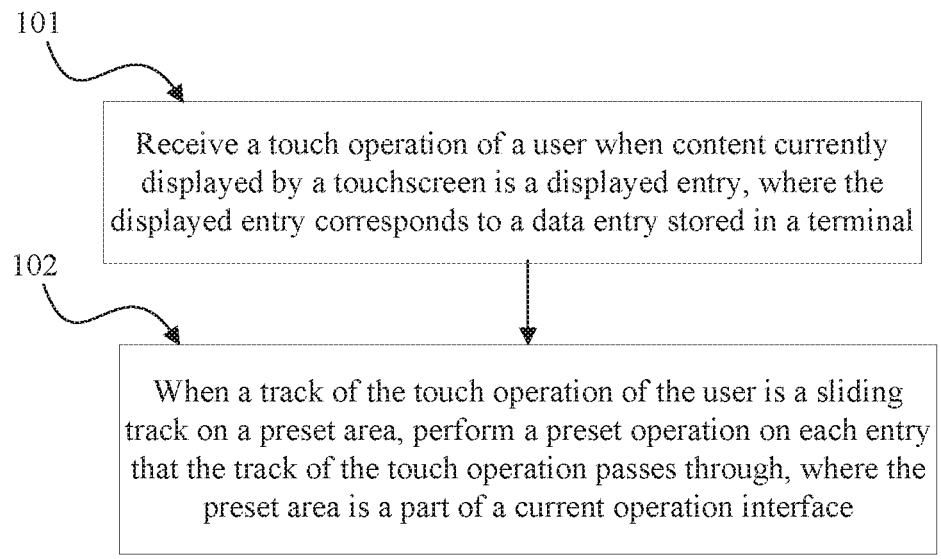
FIG. 1 is a flowchart of a method for performing an operation on a touchscreen according to Embodiment 1 of the present invention.

This embodiment of the present invention provides a method for performing an operation on a touchscreen, which, as shown in FIG. 1, includes the following steps:

101. Receive a touch operation when content currently displayed on a touchscreen is a displayed entry, where the displayed entry is data information displayed on a current interface; the displayed entry corresponds to a data entry stored in a terminal; and the touchscreen refers to a screen on which an operation may be performed by using a finger or a stylus as a touch device. It should be noted that performing an operation by a user by using a motion sensing gesture also falls within a scope defined by this embodiment of the present invention, which is not described in detail here for the convenience of description, and is described in detail later.

102. When a track of the touch operation is a sliding track on a preset area, perform a preset operation on each entry that the track of the touch operation passes through. The preset area is a part of a current operation interface.

If the touch operation is performed on the preset area, the terminal performs the preset operation on each entry of the displayed entries that the track of the touch operation passes through. Alternatively, the preset operation is a select operation or a deselect operation performed on the entry.

Figure 2:
FIG. 2 is a schematic diagram of a display interface of a terminal in Embodiment 1 of the present invention.
Figure 3:
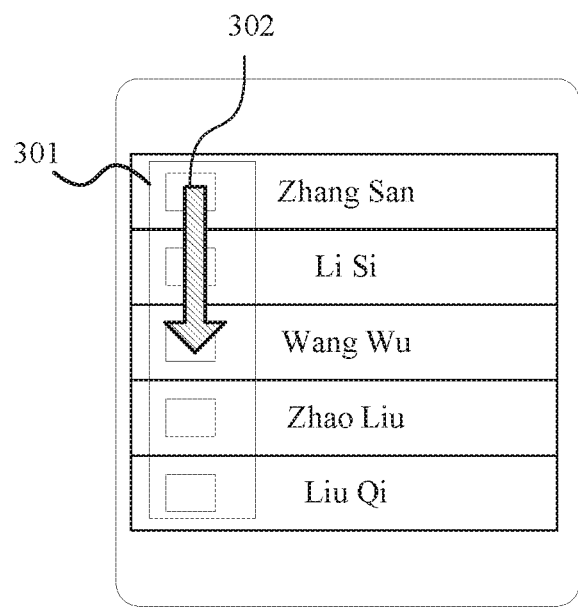
FIG. 3 is a schematic diagram showing a sliding operation performed on the basis of FIG. 2.
Figure 4:
FIG. 4 is a schematic diagram of a display interface after a sliding operation illustrated in FIG. 3 is performed.

For example, as shown in FIG. 2, entries currently displayed on a touchscreen are a contact list. In this case, a user performs a touch operation. When a track of the touch operation of the user is a sliding track on a preset area, if the touch operation 302 is performed within the preset area 301 shown in FIG. 3, a preset operation is performed on each contact entry that the track of the touch operation of the user passes through. For example, in FIG. 3, the preset operation specifically is a select operation on the contact entries. Accordingly, an effect after the selection is performed is shown in FIG. 4. If the touch operation is performed outside the preset area, displayed content is displayed after flipping, which is the same as a touchscreen display solution in the prior art and is not described herein. A scope of the preset area may be preset on the terminal and is a part of the current operation interface. The preset area may have different positions and sizes for different display interfaces and displayed entries. As shown in FIG. 3, a scope of the preset area 301 may be either a scope in which contact check boxes shown in the figure are located or another preset scope.

According to the method for performing an operation on a touchscreen provided by this embodiment of the present invention, it is detected whether a user performs a sliding operation on a preset area of a touchscreen, and when it is detected that the user performs the touch operation on the preset area, a preset operation is performed on each displayed entry that a track of the touch operation passes through, thereby avoiding an entry-by-entry operation performed by the user on displayed entries, implementing free selection and a batch operation on several entries of the displayed entries, and reducing operating time of the user.

Embodiment 2

Figure 5:
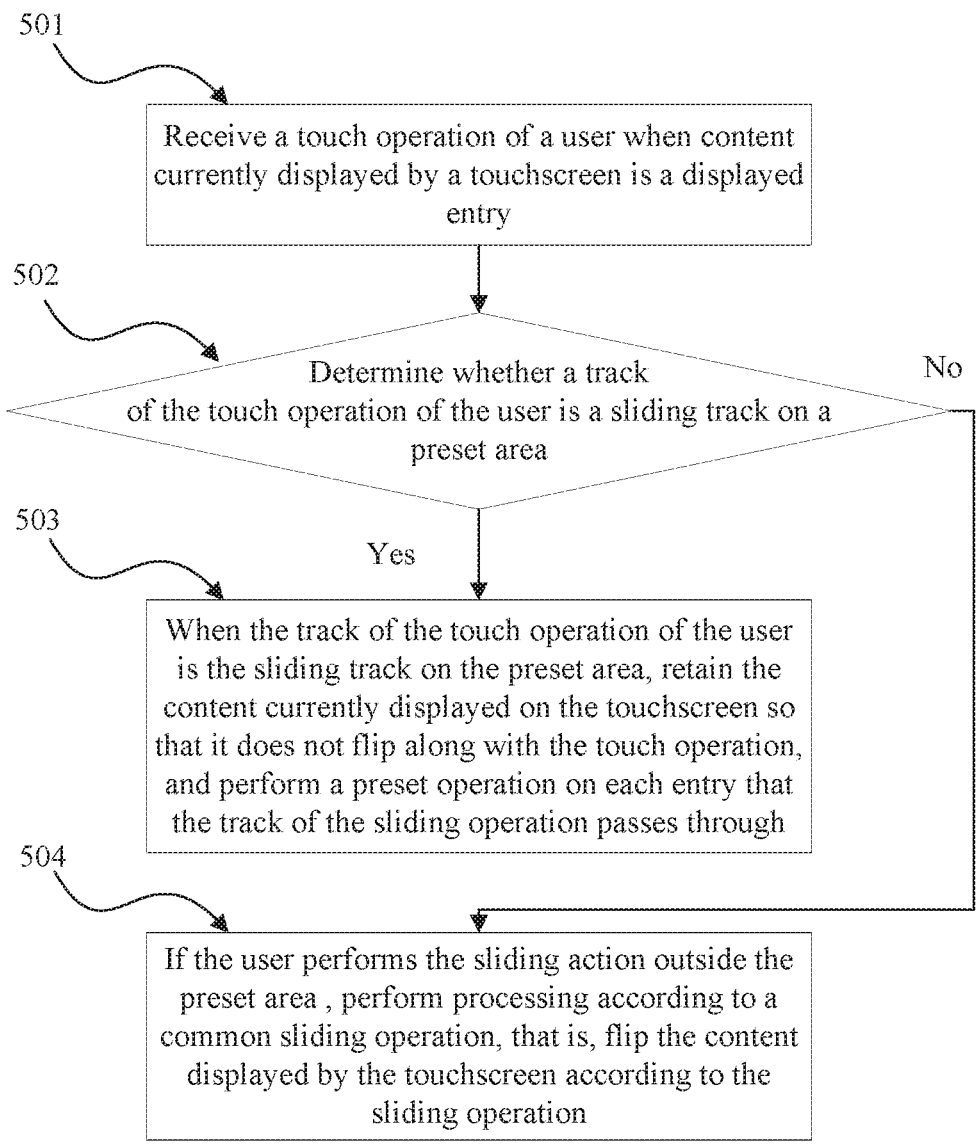
FIG. 5 is a flowchart of a method for performing an operation on a touchscreen according to Embodiment 2 of the present invention.

This embodiment of the present invention provides a method for performing an operation on a touchscreen, which, as shown in FIG. 5, includes the following steps:

501. Receive a touch operation when content currently displayed on a touchscreen is a displayed entry, where the displayed entry is data information displayed on a current interface, and the displayed entry corresponds to a data entry stored in a terminal. In one implementation manner, as shown in FIG. 3, the displayed entry is information displayed on an address book of a terminal, where each piece of information corresponds to one data entry stored in the terminal, 502. Determine whether a track of the touch operation is a sliding track on a preset area, where the preset area is a part of a current operation interface, and the current operation interface should include at least the preset area and other areas.

If a user performs a sliding operation on the preset area, continue to perform step 503; otherwise, perform step 504.

503. When the track of the touch operation of the user is the sliding track on the preset area, perform a preset operation on each entry that the track of the touch operation passes through. Alternatively, when the track of the touch operation of the user is the sliding track on the preset area, currently displayed content on the touchscreen may be retained and does not flip along with the touch operation.

Further, the preset operation of step 503 may be: when an entry that the track of the touch operation passes through is an unselected entry, performing a select operation on the entry; and when an entry that the track of the touch operation passes through is a selected entry, performing a deselect operation on the entry.

504. If the user performs the touch operation on an area outside the preset area, perform processing according to a common sliding operation. That is, content displayed on the touchscreen is flipped according to the sliding operation. Flipping mentioned in this embodiment of the present invention may be flipping and displaying an entire display page, or updating a part of displayed content on the display page, which is not limited in this embodiment of the present invention.

In addition, alternatively, when multiple entries that the track of the touch operation passes through include a selected entry and an unselected entry, the preset operation of step 503 may further be: uniformly performing a select operation or a deselect operation on the multiple entries that the track of the touch operation passes through. For example, when the multiple entries that the track of the touch operation passes through include a selected entry and an unselected entry, no detection is performed on a quantity and a select operation is performed on all entries that the track of the touch operation passes through, or a deselect operation is performed on all entries that the track of the touch operation passes through.

Alternatively, when the multiple entries that the track of the touch operation passes through include a selected entry and an unselected entry, the preset operation of step 503 may further be performing a different preset operation according to a difference between the number of selected entries and the number of unselected entries. Specifically, the following steps may be included:

S1: when the multiple entries that the track of the touch operation passes through include both a selected entry and an unselected entry, detect the number of selected entries and the number of unselected entries of the multiple entries that the track of the touch operation passes through;

S2: when the number of the selected entries is not less than the number of the unselected entries of the multiple entries that the track of the touch operation passes through, perform a deselect operation on the multiple entries that the track of the touch operation passes through; or S3: when the number of the selected entries is less than the number of the deselected entries of the multiple entries that the track of the touch operation passes through, perform a select operation on the multiple entries that the track of the touch operation passes through.

Figure 6:
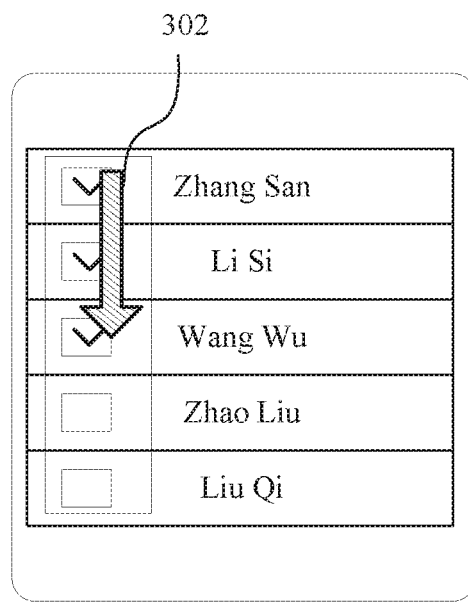
FIG. 6 is a schematic diagram showing a sliding operation performed in Embodiment 2 of the present invention.
Figure 7:
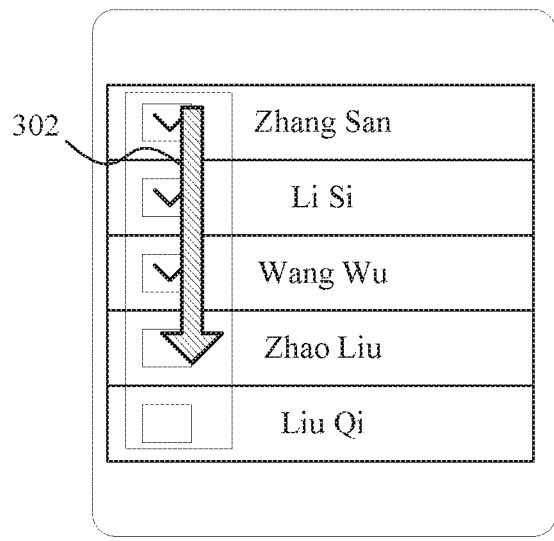
FIG. 7 is a schematic diagram showing another sliding operation performed in Embodiment 2 of the present invention.
Figure 8:
FIG. 8 is a schematic diagram of a display interface after a sliding operation illustrated in FIG. 7 is performed.

An example shown in FIG. 3 in which currently displayed entries on a touchscreen are a contact list is described. In this case, when a user performs a touch operation, where a track of the touch operation is a sliding track on a preset area 301, content currently displayed on the touchscreen is retained and does not flip, and a preset operation is performed on each entry of displayed entries that the touch operation of the user passes through. In FIG. 3, assume that the preset operation specifically is selecting a displayed entry; accordingly, an effect after selection is performed is shown in FIG. 4, where three entries of Zhang San, Li Si, and Wang Wu are selected. If a touch operation is performed again in a case shown in FIG. 4, and a track of the touch operation is still a sliding track on the preset area 301, as shown in FIG. 6, a track 302 of the touch operation slides and passes through the three selected entries, accordingly, the three entries are deselected and a display state returns to a case shown in FIG. 2. However, if the track 302 of the touch operation slides and passes through not only the three selected entries, as shown in FIG. 7, alternatively, a select operation or a deselect operation may be uniformly performed on the entries that the track passes through, or a select operation or a deselect may be selectively performed according to a difference between the number of selected entries and the number of deselected entries. If the select operation is performed, a display result is shown in FIG. 8.

If the touch operation is performed outside the preset area, displayed content is displayed after flipping, which is the same as a touchscreen display solution in the prior art. A scope of the preset area may be preset on the terminal and is a part of the current operation interface. The preset area may have different positions and sizes for different display interfaces and displayed entries. As shown in FIG. 3, a scope of the preset area 301 may be either a scope in which contact check boxes shown in the figure are located or another preset scope. In addition, alternatively, in a process of performing steps of this embodiment of the present invention, at least one of the following actions may further be performed: when the track of the touch operation of the user reaches an upper/lower edge or a left/right edge of the preset area, slide upward/downward displayed content on the touchscreen, or slide, to the left/right, displayed content on the touchscreen; and save the status of being selected or deselected of entries that the track of the touch operation passes through.

In an actual scenario, because of a difference in a terminal model or a difference in an application program, a track of a touch operation thereof may be in a left-right direction or an up-down direction. In different cases, when the track of the touch operation reaches an edge of the preset area, a flipping operation is performed and the status of being selected or deselected of entries that the track of the touch operation passes through is saved.

The reaching, by the track of the touch operation of the user, the upper/lower edge or left/right edge of the preset area may be implemented by using a method of periodically detecting a position of the track or by sending a signal to a processor when the touch operation is sensed at the edge of the screen, which is not limited in this embodiment of the present invention.

This embodiment of the present invention is described by using an example in which a displayed entry is a contact list; the displayed entry is not limited thereto in an actual scenario, and may also be an audio list, an SMS message list, and an image list, and the like. In addition, the terminal in this embodiment of the present invention may be an electronic device having a touchscreen, such as a mobile phone, a smart mobile terminal, and a navigator.

According to the method for performing an operation on a touchscreen provided by the embodiment of the present invention, it is detected whether a user performs a sliding operation on a preset area of a touchscreen, and when it is detected that the user performs the touch operation on the preset area, a preset operation is performed on each displayed entry that a track of the touch operation passes through, thereby avoiding an entry-by-entry operation performed by the user on displayed entries, implementing free selection and a batch operation on several entries of the displayed entries, and reducing operating time of the user. Moreover, according to alternative solutions provided by Embodiment 2 of the present invention, it may further be implemented that when the user's sliding operation reaches an edge of the preset area, if an operation that has been performed is stored, displayed content may be flipped, thereby facilitating an actual application.

Embodiment 3

Figure 9:
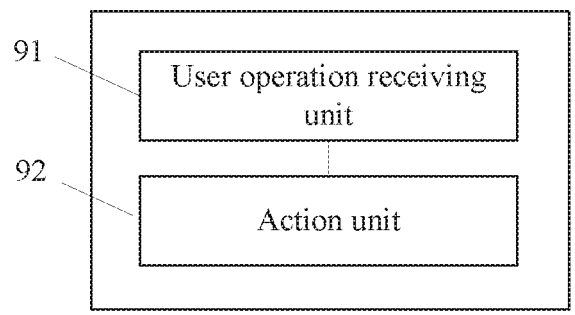
FIG. 9 is a block diagram of a terminal according to Embodiment 3 of the present invention.

This embodiment of the present invention provides a terminal. As shown in FIG. 9, the terminal includes a user operation receiving unit 91 and an action unit 92.

The user operation receiving unit 91 is configured to receive a touch operation when content currently displayed on a touchscreen is a displayed entry, where the displayed entry is data information displayed on a current interface; the displayed entry corresponds to a data entry stored in a terminal; and the touchscreen refers to a screen on which an operation may be performed by using a finger or a stylus as a touch device. It should be noted that performing an operation by a user by using a motion sensing gesture also falls within a scope defined by this embodiment of the present invention, which is not described in detail here for the convenience of description, and is described in detail later.

The action unit 92 is configured to perform, when a track of the touch operation is a sliding track on a preset area, a preset operation on each entry that the track of the touch operation passes through, where the preset area is a part of a current operation interface. If the touch operation is performed on the preset area, the terminal performs the preset operation on each entry of the displayed entry that the track of the touch operation passes through. Alternatively, the preset operation is a select operation or a deselect operation performed on the entry. A scope of the preset area may be preset on the terminal and is a part of the current operation interface. The preset area may have different positions and sizes for different display interfaces and displayed entries. As shown in FIG. 3, a scope of the preset area 301 may be either a scope in which contact check boxes shown in the figure are located or another preset scope.

Figure 10:
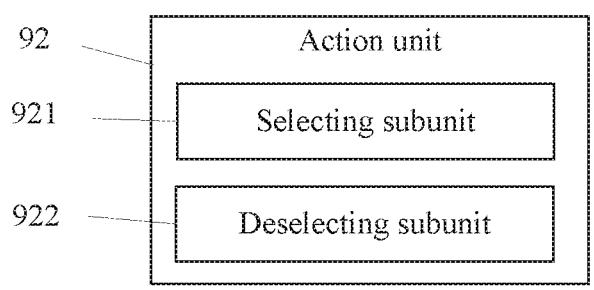
FIG. 10 is a block diagram of an action unit in Embodiment 3 of the present invention.

Further, as shown in FIG. 10, according to a difference in content of the preset operation, the action unit 92 may include a selecting subunit 921 and a deselecting subunit

922. The selecting subunit 921 is specifically configured to perform, when an entry that the track of the touch operation passes through is an unselected entry, a select operation on the entry; and the deselecting subunit 922 is configured to perform, when an entry that the track of the touch operation passes through is a selected entry, a deselect operation on the entry.

Figure 11:
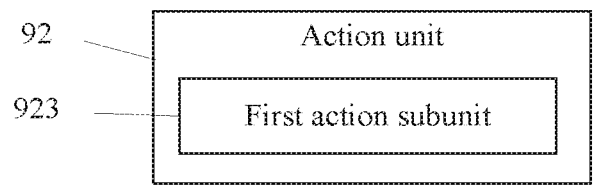
FIG. 11 is a block diagram of another action unit in Embodiment 3 of the present invention.

Moreover, alternatively, as shown in FIG. 11, the action unit 92 may include a first action subunit 923, configured to uniformly perform, when multiple entries that the track of the touch operation passes through include both a selected entry and an unselected entry, a select operation or a deselect operation on the multiple entries that the track of the touch operation passes through.

Figure 12:
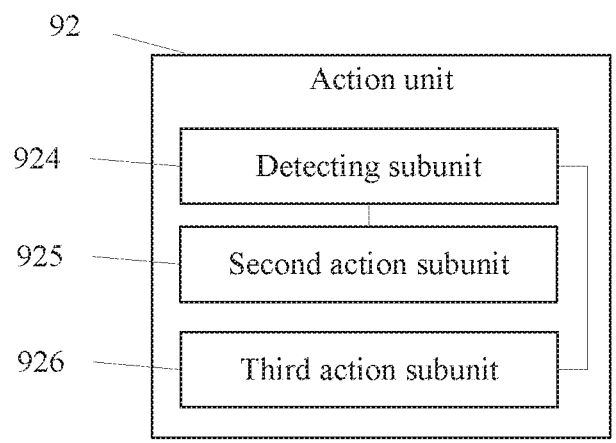
FIG. 12 is a block diagram of still another action unit in Embodiment 3 of the present invention.

In addition, alternatively, as shown in FIG. 12, the action unit 92 may include a detecting subunit 924, a second action subunit 925 and/or a third action subunit 926.

The detecting subunit 924 is configured to detect, when multiple entries that the track of the touch operation passes through include both a selected entry and an unselected entry, the number of selected entries and the number of deselected entries of the multiple entries that the track of the touch operation passes through.

The second action subunit 925 is configured to perform, when the number of the selected entries is not less than the number of the deselected entries of the multiple entries that the track of the touch operation passes through, a deselect operation on the multiple entries that the track of the touch operation passes through.

The third action subunit 926 is configured to perform, when the number of the selected entries is less than the number of the deselected entries of the multiple entries that the track of the touch operation passes through, a select operation on the multiple entries that the track of the touch operation passes through.

Figure 13:
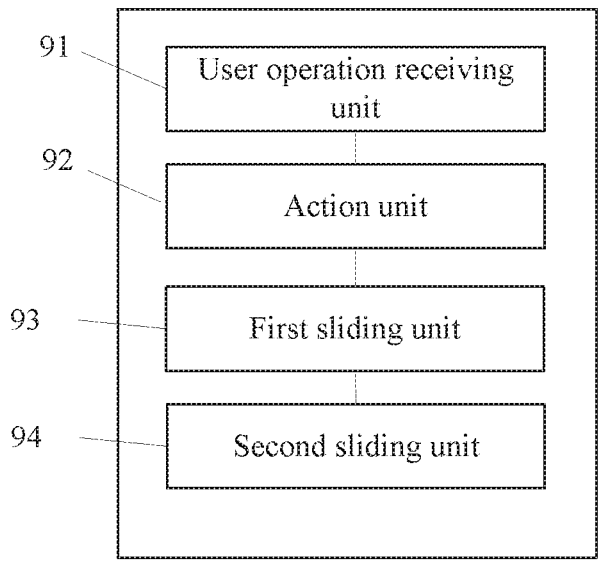
FIG. 13 is a block diagram of another terminal according to Embodiment 3 of the present invention.

Further, as shown in FIG. 13, the terminal may further include at least one of a first sliding subunit 93 and a second sliding subunit 94. The first sliding subunit 93 is configured to, when the track of the touch operation is the sliding track on the preset area and the track of the touch operation reaches an upper/lower edge of the preset area, flip upward/downward the content currently displayed on the touchscreen. The second sliding subunit 94 is configured to, when the track of the touch operation is the sliding track on the preset area and the track of the touch operation reaches a left/right edge of the preset area, flip, to the left/right, the content currently displayed on the touchscreen.

For the description of an operation of a touchscreen provided by the terminal according to this embodiment of the present invention, reference may be made to the related description of FIG. 2, FIG. 3, FIG. 4, FIG. 6, FIG. 7, and FIG. 8 in Embodiment 2, which is not described repeatedly herein.

According to the terminal in this embodiment of the present invention, it is detected whether a user performs a sliding operation on a preset area of a touchscreen, and when it is detected that the user performs the touch operation on the preset area, a preset operation is performed on each displayed entry that a track of the touch operation passes through, thereby avoiding an entry-by-entry operation performed by the user on displayed entries, implementing free selection and a batch operation on several entries of the displayed entries, and reducing operation time of the user. Moreover, by using alternative units of the terminal, it may further be implemented that when the touch operation reaches an edge of the preset area, in a case where an operation that has been performed is saved, displayed content may be flipped, thereby facilitating an actual application. It should be noted that the terminal according to this embodiment of the present invention may be an electronic device having a touchscreen, such as a mobile phone, a smart mobile terminal, and a navigator.

In addition, it should be noted that, as described in the embodiments of the present invention, the technical solutions described in the present invention are applicable not only to a touchscreen, and may also be applicable to another field, such as a motion sensing field.

Figure 14:
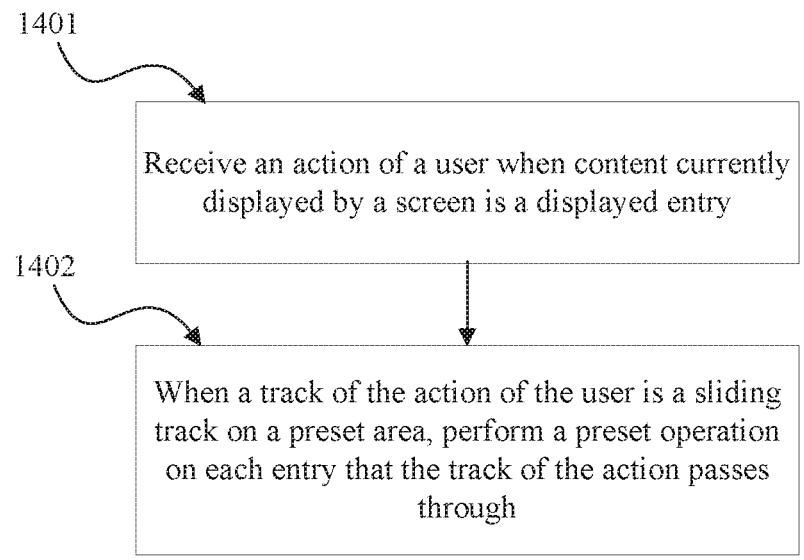
FIG. 14 is a flowchart of an operating method applicable to a motion sensing field according to an embodiment of the present invention.

When the technical solutions described in the embodiments of the present invention are applicable to the motion sensing field, as shown in FIG. 14, the method includes the following:

1401. Receive an action of a user when content currently displayed on a screen is a displayed entry, where the displayed entry corresponds to a data entry stored in a terminal.

Figure 15:
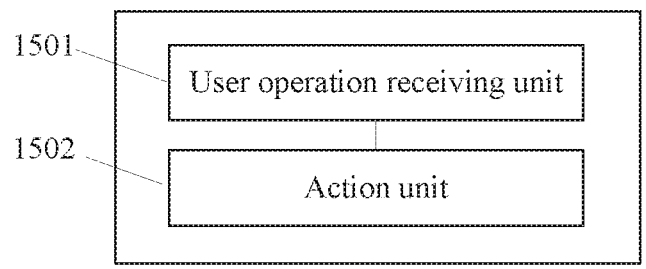
FIG. 15 is a block diagram of a terminal applicable to a motion sensing field according to an embodiment of the present invention.

1402. When a track of the action of the user is a sliding track on a preset area, perform a preset operation on each entry that the track of the touch operation passes through, where the preset area is a part of a current operation interface. The action of the user may be collected by using a sensor. The preset operation may be a select/deselect operation on the displayed entry. When the technical solutions described in the embodiments of the present invention are applicable to the motion sensing field, as shown in FIG. 15, the apparatus includes the following:

a user operation receiving unit 1501, configured to receive an action of a user when content currently displayed on a screen is a displayed entry, where the displayed entry corresponds to a data entry stored in a terminal; and an action unit 1502, configured to perform, when a track of the action of the user is a sliding track on a preset area, a preset operation on each entry that the track of the touch operation passes through, where the preset area is a part of a current operation interface. The action of the user may be collected by using a sensor. The preset operation may be a select/deselect operation on the displayed entry.

A person of ordinary skill in the art may understand that all or a part of the steps of the method embodiments may be implemented by hardware or a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for performing an operation on a touchscreen, comprising:
   displaying a plurality of entries on the touchscreen, wherein each entry corresponds to a data entry stored in a terminal;
   receiving a first touch operation having a first track;
   performing a preset operation on each entry through which the first track passes when the first track is a sliding track on a preset area by:

counting a number of selected entries and a number of unselected entries of the entries through which the first track passes when the entries through which the first track passes comprise both at least some of the selected entries and at least some of the unselected entries, wherein the preset area is a part of a current operation interface, and wherein the preset operation is a select operation or a deselect operation performed on the entries;

performing the deselect operation on the entries through which the first track passes when the number of the selected entries is not less than the number of the unselected entries of the entries through which the first track passes; and performing the select operation on the entries through which the first track passes when the number of the selected entries is less than the number of the unselected entries of the entries through which the first track passes;

flipping a content currently displayed on the touchscreen to display new entries on the touchscreen when the first track reaches an edge of the preset area; and saving a status of being selected or deselected for any entries through which the first track passes when the first track reaches the edge of the preset area.

2. The method of claim 1, wherein performing the preset operation on each entry through which the first track passes comprises:

performing the select operation on any entries through which the first track passes that are the unselected entries; and performing the deselect operation on any entries through which the first track passes that are the selected entries.

3. The method of claim 1, wherein flipping the content currently displayed on the touchscreen comprises flipping the content currently displayed on the touchscreen either upward or downward, and wherein the method further comprises performing the preset operation on each entry of updated displayed content after flipping the content currently displayed on the touchscreen either upward or downward.

4. The method of claim 1, wherein the entries through which the first track passes comprise both the selected entry and the unselected entry, and wherein performing the preset operation on each entry through which the first track passes comprises uniformly performing the select operation or the deselect operation on the entries through which the first track passes.

5. The method of claim 1, wherein the method further comprises flipping the content currently displayed on the touchscreen to either a left or a right, and wherein the first track is the sliding track on the preset area and the first track reaches a left edge or a right edge of the preset area.

6. The method of claim 1, wherein performing the preset operation on each entry through which the first track passes comprises performing the select operation on one of the entries through which the first track passes when the one entry through which the first track passes is one of the unselected entries, and wherein the method further comprises:

receiving a second touch operation having a second track; and performing the deselect operation on any entries through which the second track passes that are the selected entries.

7. The method of claim 1, wherein performing the preset operation on each entry through which the first track passes comprises performing the deselect operation on the entries when the entries through which the first track passes are the selected entries, and wherein the method further comprises:

receiving a third touch operation having a third track; and performing the select operation on any entries through which the third track passes that are deselected entries.

8. A terminal, comprising:
a touchscreen;
a memory configured to store program code; and
a processor coupled to the touchscreen and the memory, wherein the processor is configured to execute the program code, which causes the processor to be configured to:

display a plurality of entries on the touchscreen, wherein each entry corresponds to a data entry stored in the terminal;

receive a first touch operation on a preset area comprising the entries, wherein the first touch operation has a first track, and wherein the preset area is a part of a current operation interface;

perform a preset operation on each entry through which the first track passes when the first track is a sliding track over at least one of the entries, wherein the preset operation is a select operation or a deselect operation performed on the entries and comprises:

counting a number of selected entries and a number of unselected entries of the entries through which the first track passes when the entries through which the first track passes comprise both at least some of the selected entries and at least some of the unselected entries;

performing the deselect operation on the entries through which the first track passes when the number of the selected entries is not less than the number of the unselected entries of the entries through which the first track passes; and performing the select operation on the entries through which the first track passes when the number of the selected entries is less than the number of the unselected entries of the entries through which the first track passes;

flip a content currently displayed on the touchscreen to display new entries on the touchscreen when the first track reaches an edge of the preset area;

save a status of being selected or deselected for any entries through which the first track passes when the first track reaches the edge of the preset area; and update a part of displayed content on the current operation interface.

9. The terminal of claim 8, wherein the program code further causes the processor to be configured to perform the select operation on any entries through which the first track passes that are the unselected entries.

10. The terminal of claim 8, wherein flipping the content currently displayed on the touchscreen comprises flipping the content currently displayed on the touchscreen either upward or downward, and wherein the program code further causes the processor to be configured to perform the preset operation on each entry of updated displayed content after flipping the content currently displayed on the touchscreen either upward or downward.

11. The terminal of claim 8, wherein the entries through which the first track passes comprise both the selected entry and the unselected entry, and wherein the program code further causes the processor to be configured to uniformly perform the select operation or the deselect operation on the entries through which the first track passes.

12. The terminal of claim 8, wherein the program code further causes the processor to be configured to flip the content currently displayed on the touchscreen to either a left or a right, and wherein the first track is the sliding track on the preset area and the first track reaches a left edge or a right edge of the preset area.

13. The terminal of claim 8, wherein the program code further causes the processor to be configured to perform the select operation on any entries through which the first track passes that are the unselected entries.

14. The terminal of claim 8, wherein the program code further causes the processor to be configured to:
   perform the deselect operation on any entries through which the first track passes that are the selected entries;
   receive a third touch operation having a third track; and
   perform the select operation on through which the third track passes that are deselected entries.

15. The terminal of claim 8, wherein the program code further causes the processor to be configured to perform the deselect operation on the entries through which the first track passes, and wherein the number of the selected entries is not less than the number of the unselected entries of the entries through which the first track passes.

16. The terminal of claim 8, wherein the program code further causes the processor to be configured to perform the select operation on the entries through which the first track passes, and wherein the number of the selected entries is less than the number of the unselected entries of the entries through which the first track passes.

17. The terminal of claim 8, wherein the program code further causes the processor to be configured to perform the deselect operation on any entries through which the first track passes that are the selected entries.

18. The terminal of claim 13, wherein the program code further causes the processor to be configured to:
   receive a second touch operation having a second track; and
   perform the deselect operation on any entries through which the second track passes that are the selected entries.

19. The method of claim 1, wherein flipping the content comprises updating a part of displayed content on the current operation interface.

* * * * *

UNITED STATES PATENT AND TRADEMARK OFFICE
CERTIFICATE OF CORRECTION

PATENT NO. : 10,599,302 B2
APPLICATION NO. : 15/707685
DATED : March 24, 2020
INVENTOR(S) : Yi Ren and Fengbing Shi It is certified that error appears in the above-identified patent and that said Letters Patent is hereby corrected as shown below:

On the Title Page

Inventors: "Yi Ren, Shenzhen (CN)" should read "Yi Ren, Beijing (CN)"

Page 2, Column 2, Other Publications, 8 Lines down: "127369692" should read "12736969.2"

Signed and Sealed this
Twenty-sixth Day of May, 2020

Andrei Iancu
*Director of the United States Patent and Trademark Office*